March 12, 1963 R. STEINECK 3,080,804
PHOTOGRAPHIC FLASH UNIT
Filed May 9, 1960 2 Sheets-Sheet 1

Rudolf Steineck
*INVENTOR.*

BY
*Karl F. Ross*
AGENT

March 12, 1963

R. STEINECK 3,080,804

PHOTOGRAPHIC FLASH UNIT

Filed May 9, 1960

Rudolf Steineck
INVENTOR.

BY

AGENT 3,080,804
PHOTOGRAPHIC FLASH UNIT
Rudolf Steineck, P.O. Box 8, Lugano-Cassarate,
Switzerland
Filed May 9, 1960, Ser. No. 27,592
6 Claims. (Cl. 95—11.5)

My present invention relates to a photographic flash unit and, more particularly, to flash-lamp assemblies of the type generally used to provide adequate illumination for "still" photographs.

Photographic lighting units are known wherein a plurality of flash lamps, mounted close to one another on a common carrier strip, may be successively positioned in a suitable reflector so that the lamps may be fired and replaced by fresh lamps in rapid succession. In some instances, however, especially with miniature bulbs whose upper halves are filled almost completely with fusible filaments, the heat generated by the firing of the lamps was found to cause bulging of the glass envelopes which may damage adjacent bulbs and may produce a mechanical distortion or buckling of the carrier strip, thereby preventing the accurate positioning of further lamps in the reflector.

It is an object of my invention, therefore, to provide a compact illuminating device adapted accurately to position a plurality of flash lamps, carried with minimum spacing on a base of limited dimensions, successively in a reflector.

It is another object of the invention to provide simple means for automatically replacing a spent flash lamp of a photographic lighting accessory, mounted on a camera, in response to some operation occurring after the completion of an exposure, such as the advancing of the film.

It is still another object of the invention to provide an improved reflector for a flash-lamp assembly.

In accordance with the general feature of the invention, I provide an illuminating device of the character referred to wherein a plurality of conventional flash lamps are supported by a rigid rotatable carrier or turret which, upon rotation, successively positions the flash lamps in a reflector to replace burned-out lamps by fresh ones. Suitable indexing means should be, of course, provided to locate the lamps properly in the reflector. Advantageously, the individual lamps are mounted in a crown-like array upon the carrier so that their axes converge on the axis of the carrier and include acute angles, preferably of 45°, with this axis which in turn is inclined at the same angle to the axis of the reflector. The heat-producing bulbs of adjacent lamps are thus given a relatively large separation to prevent a hot, fired lamp from deforming and, possibly, exploding an adjacent fresh lamp. The size of the apparatus is, however, not materially increased since, owing to the angular inclination of the lamps, the bases thereof are close together.

According to another feature of the invention the rotatable carrier is automatically triggered by the photographer via the camera, either by the film-transport mechanism thereof or, just subsequently to exposure of the film, by the shutter-actuating mechanism, to substitute a fresh flash lamp for the previously fired lamp. The invention thus permits the rapid replacement of flash lamps without, however, requiring the photographer to grasp the hot lamp. The intermittent rotation of the carrier in response to the triggering action may be brought about by a suitable source of stored energy, such as a spring or a battery.

According to a more specific feature of my invention, the reflector of the unit is provided with an accurate slot in its wall through which the flash lamps are successively advanced past their firing position on the reflector axis.

It is known that parabolic reflectors of the type commonly in use tend to produce dark spots in the illumination field while condensing reflectors tend to bring the light rays to a sharp focus, thus causing bright spots in the field. I prefer, therefore, to use a reflector whose concave cross-section in an axial plane is an arc of a circle (or some other closed curve, such as an ellipse, osculating a circle) and to position each lamp to be fired at a location between the vertex of the reflecting surface and the midpoint of the radius terminating at that vertex. With such an arrangement the reflector will emit light rays which are partly divergent, partly convergent and partly parallel to the axis of the reflector, so that a substantially uniform illumination results within the range of its beam.

The above and other objects, features and advantages of the present invention will become more readily apparent from the following description of a specific embodiment of the invention, reference being made to the accompanying drawing in which.

Figure 1:
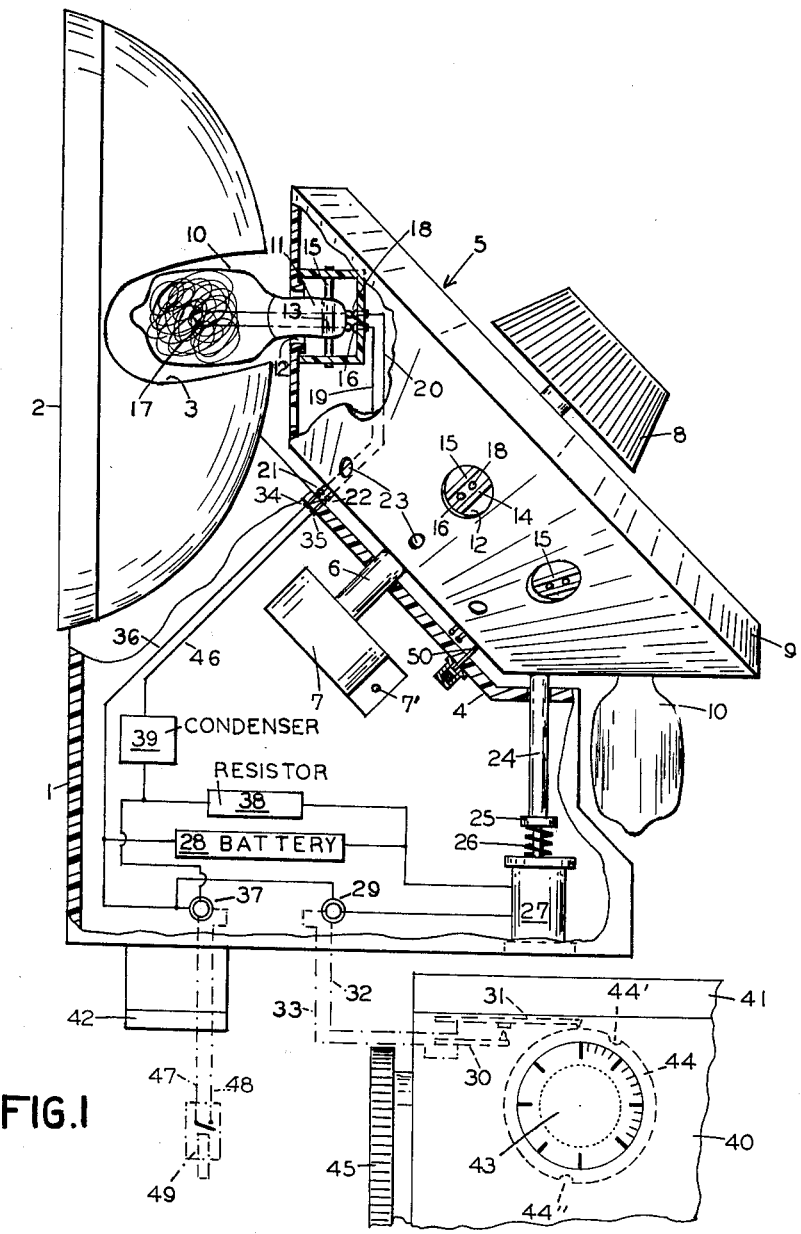
FIG. 1 is a side-elevational view, with parts broken away, illustrating a photographic flash attachment according to the invention.

In the drawing I show a flash attachment whose housing 1 supports a reflector 2 which is provided with a slot 3 adapted to admit and to discharge a succession of flash lamps 10 having their reduced bases 11 inserted within the sockets 12 of a rotatable turret 5. The latter is rigidly secured to a rod 6 which is journaled in a wall 4 of the housing 1 at an angle of 45° to the axis of the reflector. A knurled knob 8 is mounted on the rod 6 whose lower end within the housing is fastened to one end of a flat spiral spring 7 having its other end secured to the housing 1 at 7'. The sockets 12 are provided in a frustoconical wall 9 of turret 5 whose generatrices are inclined at an angle of 45° to the rod 6, hence the lamps 10 are perpendicular to the wall 9 but inclined at an angle of 45° to the rod so that, upon rotation through slot 3 into firing position in reflector 2, the lamps will be co-axial with the reflector.

Each lamp 10 is provided with a generaly cylindrical bulb containing, in its upper half, a filament 17 whose contacts emerging from the base 11 of the lamp engage the stationary electrodes 16 and 18 resiliently secured to the turret 5. The electrodes 16 and 18 are connected via leads 19 and 20 to a pair of wiper terminals 21, 22, respectively, embedded in the base 5' of the turret 5. The lamps 10 are held in place within the sockets 12 by a pair of resilient pins 14, 15 adapted to engage the annular groove 13 provided in the lamp base 11.

The turret 5 is provided with a plurality of indexing recesses 23, corresponding in number to the number of sockets 12, adapted to receive the rounded end of an indexing rod 24 to position the lamps exactly in line with the axis of the reflector. Indexing rod 24 is formed with an annular shoulder 25 which bears upon a coil spring 26, the latter being compressed between the shoulder 25 and a solenoid coil 27 within which the rod 24 is vertically displaceable.

Figure 2:
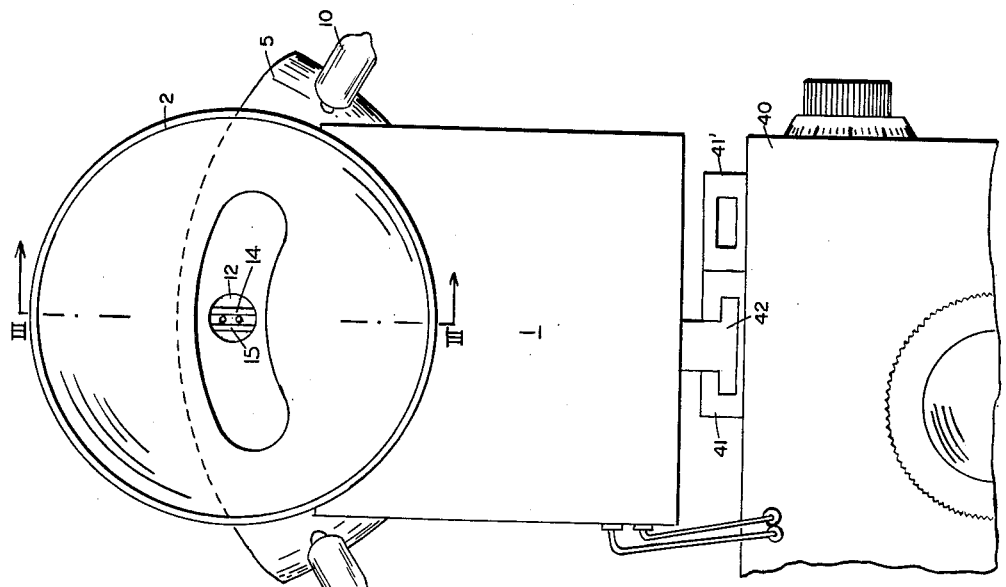
FIG. 2 is a front-elevational view of the attachment.

One lead of solenoid coil 27 is connected to one pole of a battery 28 whose other pole is connected to a jack 29. The other lead of the solenoid 27 is connected to the other terminal of the jack. As shown in FIGS. 1 and 2, the jack 29 may be connected by leads 32, 33, respectively, across switch contact arms 30, 31 (schematically indicated within a camera 40. This film-transport mechanism 43 of the camera is provided with a preferably spring-driven cam 44 adapted to trigger the normally open switch whose arm 30 engages one of two notches 44', 44" whenever a new frame is positioned before the camera objective 45. The camera 40 is also provided with a rail 41, adapted to receive the foot 42 provided on housing 1, to mount the attachment on the camera; rail 41 may be an extension of the camera view finder 41'.

One of the several pairs of wiper terminals or contact pins 21, 22 on turret base 5', i.e. the pair corresponding to the lamp 10 operatively positioned within the reflector, engage stationary pins 34, 35 of a firing circuit for the lamp. Pin 34 is connected by a lead 36 to the positive pole of the battery 28 and to one terminal of a jack 37 whose other terminal is connected to the negative pole of the battery through a load resistor 38. A condenser 39 is connected to the latter jack terminal and to the pin 35 by a lead 46; a normally open switch 49, synchronized with the camera shutter, is connected via leads 47 and 48 to the terminals of jack 37. A spring-loaded brake pin 50, supported on wall 4, bears upon the lower face of turret 5 (which could be suitably roughened for this purpose) to retard its rotation from one indexed angular position to the next.

In operation, the knob 8 is rotated counterclockwise (FIG. 2) to wind spring 7, thereby camming indexing rod 24 out of recesses 23 until the spring 7 is fully wound to an extent enabling it to cause at least one revolution of turret 5. Indexing rod 24 is then urged by spring 26 into a recess 23 to secure the turret 5 against motion. The turret, or rotating carrier, is then studded with the lamps 10 which are inserted in their sockets 12. The condenser 39 will now charge at low rate through the lamp 10 positioned in the reflector, whose pins 21, 22 contact the stationary pins 34, 35, and the load resistor 38 whose magnitude is such as to limit this charging current to a magnitude insufficient to fire the lamp. When the shutter of the camera is tripped, switch 49 is simultaneously closed, thereby discharging the condenser 39 through the lamp 10 in the reflector and firing it. The battery 28 is shunted through the load resistor 38 which, in view of its high resistance, causes only a small current drain from the battery. Subsequently the film-transport mechanism 43 is operated to position a new frame in front of the objective 45. Switch 30, 31 is momentarily closed by the rotation of cam 44, thus briefly actuating the solenoid 27 to withdraw the indexing rod 24 from its recess 23. Under the action of spring 7, the carrier 5 rotates a new lamp into position in the reflector 2 whereupon indexing rod 24 enters the next recess 23 while condenser 39 once again charges for another photograph. The process may be repeated until all the flash lamps are consumed, whereupon they may be replaced by fresh lamps; turret 5 may then be re-wound for a new cycle. Advantageously the turret should carry sufficient lamps 10 to utilize fully all the frames of the film.

Figure 3:
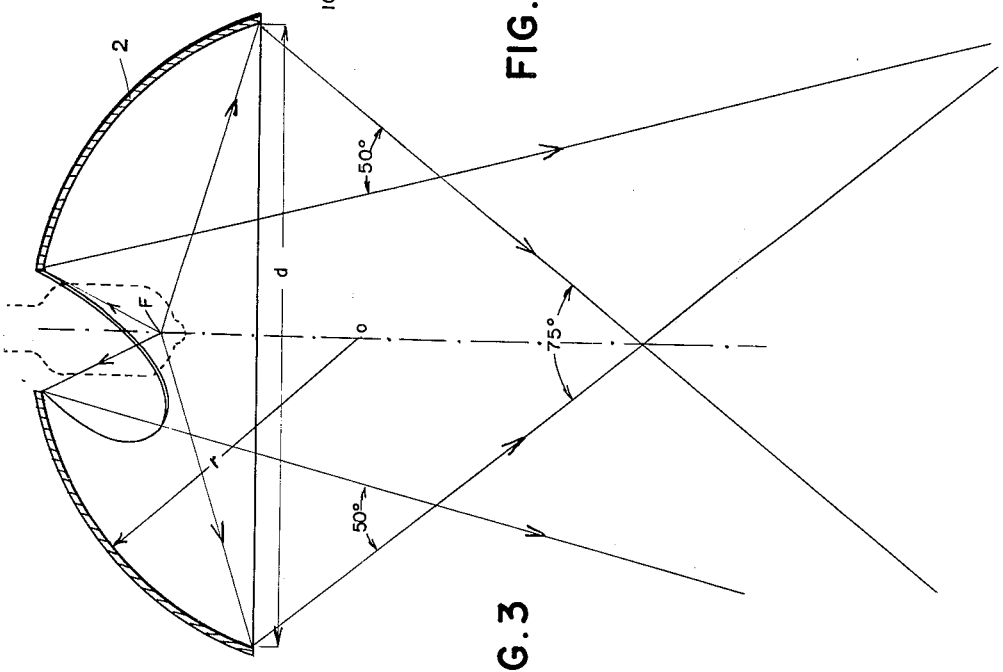
FIG. 3 is a cross-sectional view taken along line III—III of FIG. 2.

As best seen in FIG. 3, the reflector is so designed that the angle included in each axial plane by the innermost divergent rays (reflected at the edge of slot 3) and the outermost convergent rays (reflected at the periphery of the reflector) is about 50° when the source of light is located at a firing point F whose distance from the vertex V of its concave side is less than half of its radius $r$. The center of the generally spherical reflector is shown at O. Firing point F coincides with the center of the filament-filled upper bulb portion of an operatively positioned lamp 10. The maximum beam spread is 75°.

In a specific embodiment, designed for flash lamps having an overall length of 30 to 40 mm., a bulb length of 20 to 25 mm. and a bulb diameter of 10 to 15 mm., the radius $r$ of the reflector is approximately 40 mm., its peripheral diameter $d$ ranges from 70 to 80 mm. (being preferably 78 mm.), and the distance from V to F is about 17 mm. The width of slot 3 is only slightly in excess of the bulb diameter, e.g. 16 mm.

It will be apparent that a Geneva mechanism or an electric motor may be readily substituted for the spring and indexing mechanism shown, and that other modifications believed to be readily apparent to persons skilled in the art are intended to be included within the spirit and scope of the invention, except as further limited by the appended claims.

I claim:

1. A photographic device comprising a camera having a shutter, a housing attached to said camera, a concave reflector supported on said housing, a rotatable turret on said housing adjacent said reflector, said turret being provided with a plurality of peripherally spaced lamp sockets, said reflector being provided with a slot adapted to be traversed by a succession of flash lamps respectively lodged in said sockets whereby said lamps can be consecutively brought into a firing position in said reflector, a source of electric energy in said housing, a series of angularly spaced first contacts on said turret having leads respectively terminating at said sockets, a stationary second contact on said housing successively engageable by said first contacts upon rotation of said turret, co-operating indexing means on said turret and on said housing for arresting said turret in a plurality of angular positions in which said second contact engages respective ones of said first contacts, said lamps respectively occupying said firing position in said angular positions, conductor means connecting said source and said second contact in a circuit for energizing a lamp in firing position by way of a respective first contact, normally open switch means in said circuit controlled by said shutter for momentarily closing said circuit at the time of an exposure, release means for momentarily inactivating said indexing means between exposures, and force-exerting means acting upon said turret for rotating same to the next angular position upon the inactivation of said release means.

2. A device according to claim 1 wherein said force-exerting means comprises a spring.

3. A device according to claim 1 wherein said camera is provided with film-transport means operable between exposures, said release means being controlled by said film-transport means.

4. A device according to claim 1 wherein said camera and said housing are provided with co-operating mounting means for removably attaching said housing to said camera.

5. A device according to claim 1 wherein said release means comprises an electromagnetic element and circuit means for energizing said element from said source.

6. A device according to claim 1, further comprising brake means for retarding the rotation of said turret between said angular positions.

References Cited in the file of this patent

UNITED STATES PATENTS

| | | |
|---|---|---|
| 2,408,469 | Malloy | Oct. 1, 1946 |
| 2,485,404 | Noel | Oct. 18, 1949 |
| 2,671,387 | Knight | Mar. 9, 1954 |